(12) United States Patent
Smith

(10) Patent No.: US 9,174,286 B1
(45) Date of Patent: Nov. 3, 2015

(54) METHOD FOR REPAIRING A BLOWOUT PREVENTER AT SEA

(71) Applicant: MERIDIAN EQUIPMENT, INC., Houston, TX (US)

(72) Inventor: Jeffery A. Smith, Houston, TX (US)

(73) Assignee: MERIDIAN EQUIPMENT, INC., Houston, TX (US)

( * ) Notice: Subject to any disclaimer, the term of this patent is extended or adjusted under 35 U.S.C. 154(b) by 4 days.

(21) Appl. No.: 14/659,896

(22) Filed: Mar. 17, 2015

Related U.S. Application Data

(60) Provisional application No. 62/059,759, filed on Oct. 3, 2014.

(51) Int. Cl.
| | |
|---|---|
| *B23P 6/00* | (2006.01) |
| *B23C 1/20* | (2006.01) |
| *B23C 1/06* | (2006.01) |
| *B23C 3/00* | (2006.01) |
| *E21B 29/12* | (2006.01) |
| *E21B 33/064* | (2006.01) |
| *B23Q 9/00* | (2006.01) |
| *G05B 19/406* | (2006.01) |

(52) U.S. Cl.
CPC ... *B23C 1/20* (2013.01); *B23C 1/06* (2013.01); *B23C 3/00* (2013.01); *B23P 6/00* (2013.01); *E21B 29/12* (2013.01); *B23Q 9/0007* (2013.01); *B23Q 9/0014* (2013.01); *B23Q 9/0028* (2013.01); *E21B 33/064* (2013.01); *G05B 19/406* (2013.01); *Y10T 29/49723* (2015.01); *Y10T 29/49725* (2015.01); *Y10T 409/303752* (2015.01)

(58) Field of Classification Search
CPC ......... B23P 6/00; E21B 33/06; E21B 33/064; E21B 29/12; E21B 41/007; Y10T 409/301344; Y10T 409/30644; Y10T 409/306834; Y10T 409/303752; Y10T 29/49723; Y10T 29/47925; B23C 3/00; B23C 1/20; B23Q 9/02; B23Q 9/0042; B23Q 9/0028; B23Q 9/0014; B23Q 9/0007; B23Q 17/2233; G05B 19/406; G05B 19/188; G05B 19/19; G05B 19/409
See application file for complete search history.

(56) References Cited

U.S. PATENT DOCUMENTS

| | | | | |
|---|---|---|---|---|
| 5,001,818 A | * | 3/1991 | Kramer et al. | ............... 29/26 B |
| 2004/0265081 A1 | * | 12/2004 | Buttrick, Jr. | ................... 408/76 |

* cited by examiner

*Primary Examiner* — Jermie Cozart
(74) *Attorney, Agent, or Firm* — Buskop Law Group, PC; Wendy Buskop

(57) ABSTRACT

A method for repairing a blowout preventer using a blowout preventer milling assembly while in an operational configuration at sea. The blowout preventer is lifted while secured to casing and the blowout preventer is locked to the platform of a rig. The opening doors of a gasket chamber of a blowout preventer have a gasket surface for resurfacing. A pair of legs slides into grooves in the gasket chamber. A support frame is attached to the pair of legs using a plurality of spring loaded mounting assemblies. A pneumatic spindle with a calibration head inserts into a spindle holder of the support frame. Each actuator of the support frame is connected to a portable controller. The portable controller calibrates a location of the pneumatic spindle over the gasket surface for resurfacing using the portable controller.

9 Claims, 10 Drawing Sheets

FIGURE 8

| | |
|---|---|
| OPENING A BLOWOUT PREVENTER DOOR TO REVEAL A CHAMBER SURROUNDING A GASKET OF A BLOWOUT PREVENTER | 300 |
| INSERTING LEGS INTO GROOVES ON OPPOSITE SIDES OF THE GASKET | 302 |
| ATTACHING THE BLOWOUT PREVENTER MILLING ASSEMBLY TO THE LEGS | 304 |
| INSERTING A PNEUMATIC SPINDLE WITH A CALIBRATION HEAD INTO THE SPINDLE HOLDER ON THE BRIDGE FRAME | 306 |
| CONNECTING A SUPPORT FRAME ACTUATOR AND A BRIDGE FRAME ACTUATOR TO A PORTABLE CONTROLLER THAT IS CONNECTED TO A POWER A SUPPLY | 308 |
| LOCATING A GASKET SURFACE IN A BLOWOUT PREVENTER USING THE CALIBRATION HEAD AND PORTABLE CONTROLLER | 310 |
| OBTAINING A PRESET SIZE OF THE GASKET FOR THE PARTICULAR BLOWOUT PREVENTER FROM A LIBRARY OF GASKET SIZES IN THE PORTABLE CONTROLLER DATA STORAGE | 311 |
| USING COMPUTER INSTRUCTIONS IN THE PORTABLE CONTROLLER DATA STORAGE TO INSTRUCT THE PORTABLE CONTROLLER PROCESSOR TO ALIGN THE SPINDLE HOLDER TO THE CENTER OF THE GASKET SURFACE ON THE BLOWOUT PREVENTER | 312 |
| VERIFYING THAT THE GASKET SURFACE IS ALIGNED WITH THE SUPPORT FRAME RAILS USING AN INDICATOR ON THE CALIBRATION HEAD | 313 |
| REMOVING THE CALIBRATION HEAD AND PLACING A CUTTING HEAD ON THE PNEUMATIC SPINDLE, AND PLACING THE PNEUMATIC SPINDLE WITH CUTTING HEAD IN THE SPINDLE HOLDER | 314 |
| USING THE CUTTING HEAD AND PORTABLE CONTROLLER TO MILL THE GASKET SURFACE IN A BLOWOUT PREVENTER | 315 |
| DISENGAGING THE CUTTING HEAD FROM THE POWER SUPPLY AND REMOVING THE BLOWOUT PREVENTER MILLING ASSEMBLY | 316 |
| REMOVING THE LEGS | 317 |

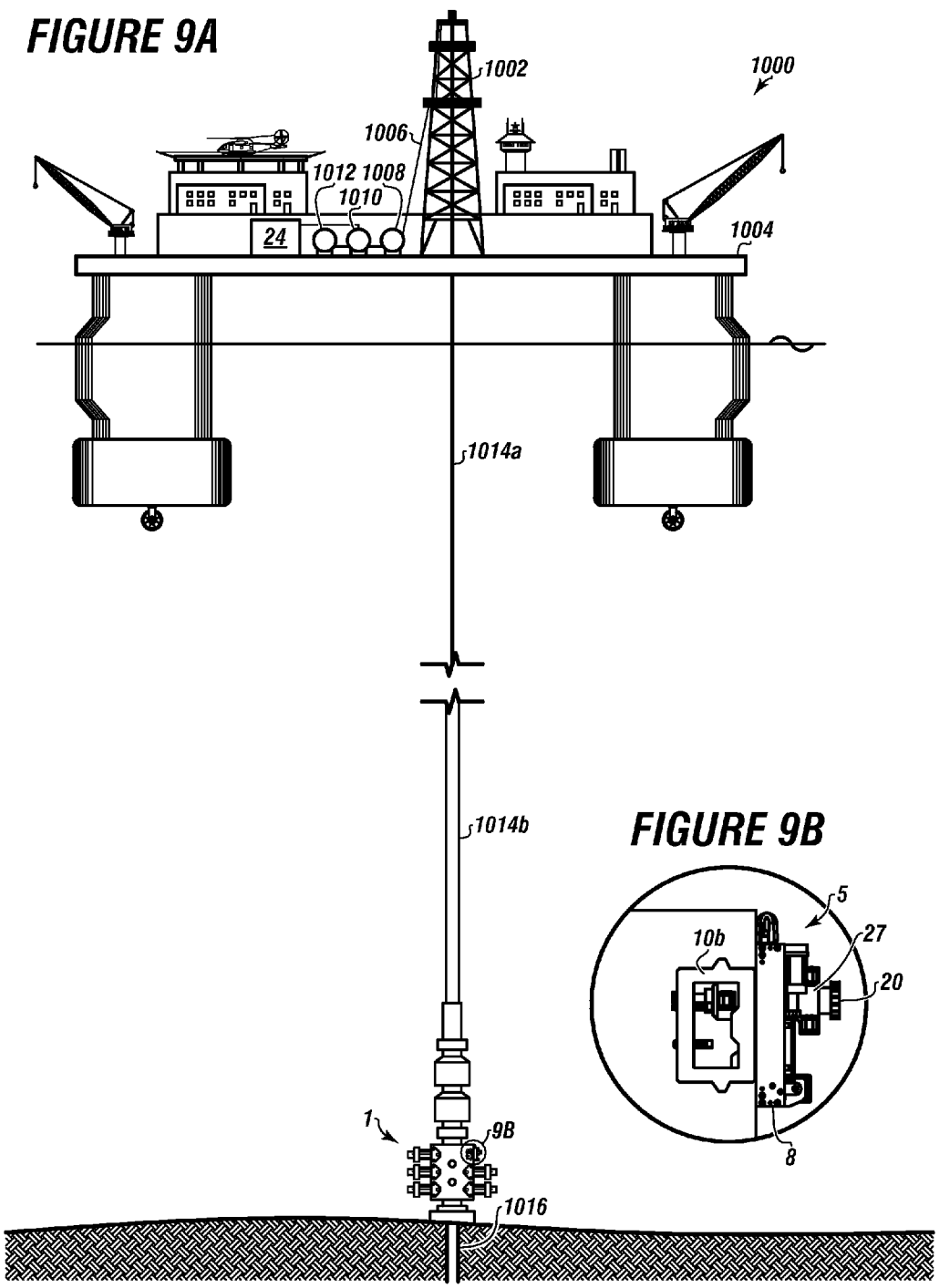

FIGURE 10

| | |
|---|---|
| LIFTING A BLOWOUT PREVENTER WHILE SECURED TO CASINGS OR TUBULARS AND IN AN OPERATIONAL CONFIGURATION TO A DECK OR PLATFORM OF A RIG AT SEA | 2000 |
| LOCKING THE BLOWOUT PREVENTER TO THE DECK OR PLATFORM OF A RIG AT SEA | 2002 |
| OPENING DOORS OF A GASKET CHAMBER OF THE BLOWOUT PREVENTER EXPOSING A GASKET SURFACE | 2004 |
| SLIDING A PAIR OF LEGS INTO GROOVES IN THE GASKET CHAMBER | 2006 |
| ATTACHING A BLOWOUT PREVENTER MILLING ASSEMBLY TO THE PAIR OF LEGS USING A PLURALITY OF SPRING LOADED MOUNTING ASSEMBLIES | 2008 |
| INSERTING A PNEUMATIC SPINDLE WITH A CALIBRATION HEAD INTO A SPINDLE HOLDER OF THE BLOWOUT PREVENTER MILLING ASSEMBLY | 2010 |
| CONNECTING AT A SUPPORT FRAME ACTUATOR OF THE BLOWOUT PREVENTER MILLING ASSEMBLY TO A PORTABLE CONTROLLER, AND CONNECTING A BRIDGE FRAME ACTUATOR OF THE BLOWOUT PREVENTER MILLING ASSEMBLY TO THE PORTABLE CONTROLLER; ENABLING SIMULTANEOUS MOVEMENT ALONG AN X-AXIS AND Y-AXIS OF THE BLOWOUT PREVENTER MILLING ASSEMBLY | 2012 |
| CONNECTING THE PORTABLE CONTROLLER TO A POWER SUPPLY | 2014 |
| CALIBRATING A LOCATION OF THE PNEUMATIC SPINDLE OVER THE GASKET SURFACE USING THE PORTABLE CONTROLLER; THE PORTABLE CONTROLLER CONTROLLING X-AXIS AND Y-AXIS MOVEMENT SIMULTANEOUSLY BY BOTH ACTUATORS | 2016 |
| OBTAINING A PRESET SIZE OF THE GASKET SURFACE FROM A LIBRARY OF GASKET SIZES IN THE PORTABLE CONTROLLER DATA STORAGE | 2018 |
| REPLACING THE CALIBRATION HEAD OF THE PNEUMATIC SPINDLE AFTER CALIBRATION WITH A CUTTING HEAD | 2020 |
| CONNECTING THE PNEUMATIC SPINDLE WITH THE CUTTING HEAD TO A PNEUMATIC AIR SUPPLY | 2021 |
| ACTIVATING THE PNEUMATIC AIR SUPPLY TO PROVIDE PRESSURIZED AIR IN A RANGE OF 85 PSI TO 95 PSI TO THE PNEUMATIC SPINDLE WITH THE CUTTING HEAD | 2022 |
| AUTOMATICALLY REFINISHING THE GASKET SURFACE USING THE CUTTING HEAD BY SIMULTANEOUSLY MOVING THE SUPPORT FRAME ACTUATOR ALONG AN X-AXIS AND THE BRIDGE FRAME ACTUATOR ALONG A Y-AXIS, MOVING THE PNEUMATIC SPINDLE IN A PREDETERMINED PATTERN OVER THE GASKET SURFACE USING AN IDENTIFIED GASKET SIZE BI-DIRECTIONALLY | 2024 |
| DE-ENERGIZING THE PNEUMATIC AIR SUPPLY | 2026 |
| DISENGAGING THE PNEUMATIC SPINDLE WITH THE CUTTING HEAD FROM THE DE-ENERGIZED PNEUMATIC AIR SUPPLY | 2028 |
| REMOVING THE BLOW OUT PREVENTER MILLING ASSEMBLY FROM THE PAIR OF LEGS | 2030 |
| REMOVING THE PAIR OF LEGS FROM THE GROOVES OF THE BLOWOUT PREVENTER FORMING A REPAIRED BLOWOUT PREVENTER GASKET WHILE THE BLOWOUT PREVENTER IS IN OPERATIONAL CONFIGURATION AT SEA AND WHILE THE BLOW OUT PREVENTER IS IN LINE WITH CASING OR TUBULARS AND SECURED TO CASINGS OR TUBULARS OF A WELLBORE | 2032 |

METHOD FOR REPAIRING A BLOWOUT PREVENTER AT SEA

CROSS REFERENCE TO RELATED APPLICATION

The current application claims priority to and the benefit of U.S. Provisional Patent Application Ser. No. 62/059,759 filed on Oct. 3, 2014, entitled "METHOD FOR REPAIRING A BLOWOUT PREVENTER AT SEA". This reference is herein incorporated in its entirety.

FIELD

The embodiments generally relate to a method for repairing gaskets of a blowout preventer at sea.

BACKGROUND

A blowout preventer is a valve or similar mechanical device, usually installed redundantly in stacks, or on subsea oil wells, used to seal, control and monitor oil and gas wells.

Blowout preventers were developed to cope with extreme erratic pressures and uncontrolled flow emanating from a well reservoir during drilling.

Drilling accidents in the Gulf of Mexico resulted in new rules for inspection of offshore production rig blowout preventers and offshore drilling rig blowout preventers.

Blowout preventers are critical to the safety of crew, rig and environment, and to the monitoring and maintenance of well integrity. Their successful operation will save many lives.

A need exists for a method to re-mill gasket surfaces of blowout preventers while the blowout preventer is still attached to a casing line or to tubulars to minimize the amount of time the well needs to be shut down.

The present embodiments meet these needs.

BRIEF DESCRIPTION OF THE DRAWINGS

The detailed description of the method will be better understood in conjunction with the accompanying drawings as follows:

FIG. 8 depicts an embodiment of a method for using the blowout preventer milling assembly.

FIG. 9A depicts a rig usable with the blowout preventer milling assembly.

FIG. 9B is a detail of the blowout preventer milling assembly installed on a blowout preventer.

FIG. 10 is an exemplary sequence of steps to implement the method according to the embodiments.

Figure 1:
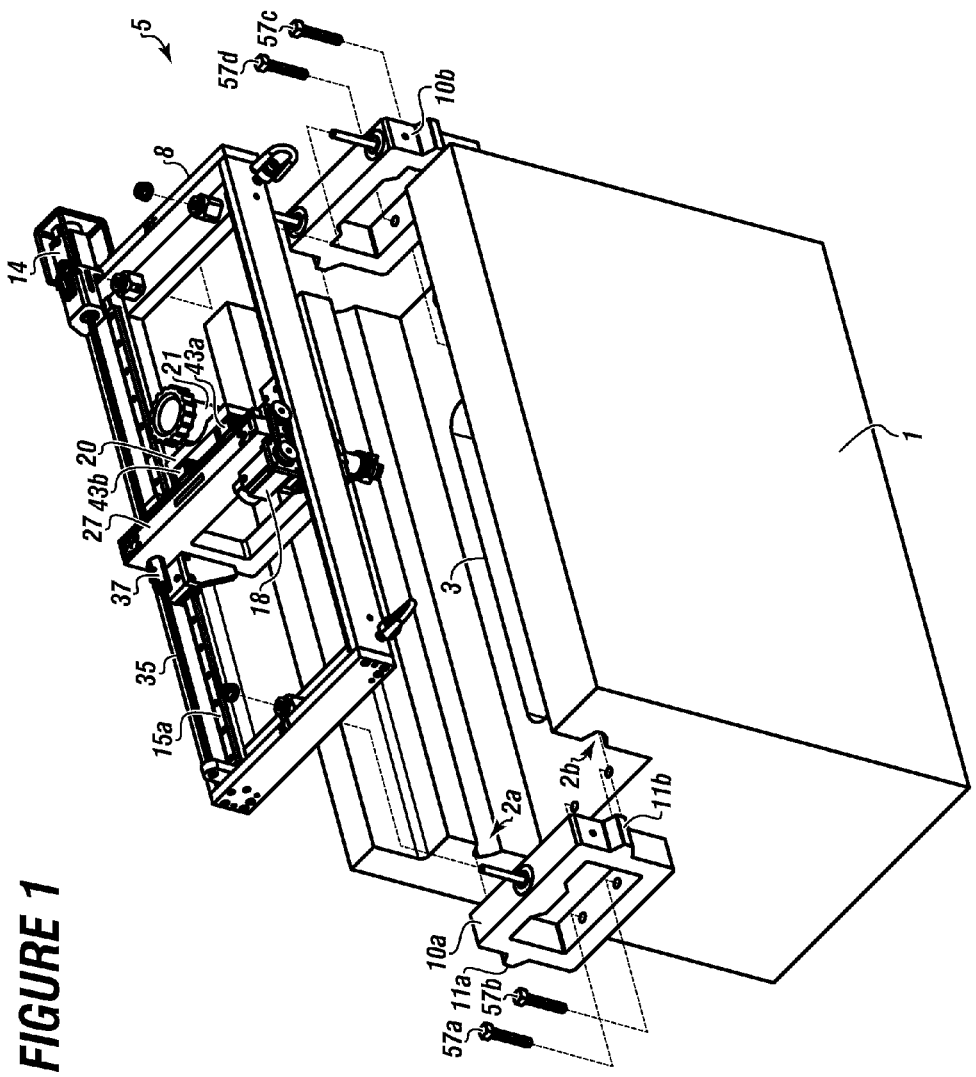
FIG. 1 depicts an exploded view of an embodiment of the blowout preventer milling assembly.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present method repairs and refinishes gasket surfaces at sea for a blowout preventer (BOP) and will save power costs and expense of removing a blowout preventer from a wellbore and transporting it to and from the shore.

The method described herein will help save saves lives by allowing a remote operator located miles from a site to do the gasket refinishing from an operator's client device, which can be a computer.

The method relates to a series of steps to repair a blowout preventer at sea using a blowout preventer milling assembly for milling gasket surfaces in a blowout preventer.

In an embodiment, the method for repairing a blowout preventer while in operational configuration at sea can include lifting a blowout preventer while secured to casing and in an operational configuration to a rig deck at sea.

The method can include locking the blowout preventer to the platform, such as a deck, at sea.

The method can include opening doors to a gasket chamber.

The method can include inserting a pair of legs into pre-existing grooves formed in the gasket chamber.

The method can include attaching a support frame to the pair of legs using a plurality of spring loaded mounting assemblies.

The method can include inserting a pneumatic spindle with a calibration head into a spindle holder of the support frame.

As a next step, the method can include connecting each actuator, which can be linear actuators, of the support frame to a portable controller. The first linear actuator can be mounted at a 90 degree angle to a second linear actuator.

The method can include connecting the portable controller to a power supply, such as a generator of the rig.

The method can include calibrating a location of the pneumatic spindle over the gasket surface using a pneumatic spindle with calibration head mounted into a spindle holder mounted to a second pair of rails movable by the second actuator, which can also be a linear actuator.

The calibration can be performed by controlling movement of the pneumatic spindle in an x-axis and y-axis simultaneously using the portable controller.

In the method, the portable controller can have a portable controller processor and a portable controller data storage.

The portable controller processor can implement computer instructions to: obtain a preset size of the gasket surface from a library of gasket sizes in the data storage of the portable controller; align the pneumatic spindle to a center location of the gasket surface on the blowout preventer; verify that the gasket surface is aligned with the first pair of rails of the support frame using an indicator on the calibration head of the pneumatic spindle; replacing the calibration head of the pneumatic spindle after calibration with a cutting head; connecting the pneumatic spindle with cutting head to a pneumatic air supply; activating the pneumatic air supply to provide pressurized air in a range from 85 psi to 95 psi to the pneumatic spindle with cutting head; and automatically refinishing the gasket surface using the cutting head by moving the linear actuators in a predetermined pattern enabling the pneumatic spindle to move over the gasket surface using the identified gasket size.

Once the refinishing is done, the method can include de-energizing the pneumatic air supply; and then disengaging the pneumatic spindle with cutting head from the de-energized pneumatic air supply.

The method can include removing the support frame from the pair of legs and removing the pair of legs from the grooves of the blowout preventer.

In doing so, the repair to the blowout preventer gasket surface can be completed while the blowout preventer is in operational configuration and at sea and while the blowout preventer is inline and secured to casing or tubulars of the wellbore.

The method can include previewing installation of the blowout preventer milling assembly using a portable controller display, such as a touch display, connected to the portable controller.

The method can include using an emergency stop button to quickly terminate power to the blowout preventer milling assembly.

The method can use a portable controller with a processor, data storage and display to communicate both signals and power to the two actuators providing precise movement of the spindle holder over the gasket surface.

Embodiments of the method can include connecting the portable controller processor of the portable controller to both (i) a multiport motor drive of the portable controller and (ii) a network for communicating with a client device, enabling the blowout preventer milling assembly to be operated from a remote location with the client device connected to the network.

The portable controller can be in an impact proof, water proof plastic or rubberized housing.

The portable controller can send movement signals to and receive signals from (bi-directionally) the support frame actuator and bridge frame actuator.

The portable controller can receive power from a power supply and transfer the power, such as using a rectifier or a transformer, to each of the actuators.

The portable controller processor can communicate with a network that communicates to a client device.

The portable controller itself can control the movement of the actuators to move the spindle accurately over the gasket surface to mill the gasket surface of the blowout preventer.

The client device via the network can instruct the portable controller to control the movement of the actuators and move the pneumatic spindle accurately over the gasket surface to mill the gasket surface of the blowout preventer.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "network" refers to a satellite network, cellular network, internet network, a peer to peer network, a local area network, a wide area network, another global communication network, or combinations of these networks.

The processor can be a computer, a programmable logic circuit, or another similar processor.

The display can be an interactive touch display, such as those used in tablet computers.

Turning now to the Figures, FIG. 1 depicts an exploded view of an embodiment of the blowout preventer milling assembly 5 positioned over a gasket surface 3 of a blowout preventer 1.

The blowout preventer milling assembly 5 can have a first leg 10a and a second leg 10b, which herein can be referred to as the pair of legs. Each leg can be generally square in shape with an extension that allows each leg to slide into both first groove 2a and second groove 2b in the blowout preventer 1 using an extension 11a and 11b on each leg.

A support frame 8 can be mounted to both of the first leg 10a and the second leg 10b.

The support frame 8 can extend away from the pair of legs and extend away from the blowout preventer 1 above the gasket surface 3.

The support frame 8 can include a pair of support frame rails mounted in parallel to the support frame 8. A first support frame rail 15a is shown in this Figure.

The support frame 8 can include a support frame actuator 14. The support frame actuator 14 can cause a bridge frame 27 to travel along the parallel support frame rails on an x-axis. The support frame actuator 14 can be a linear actuator with a ball screw 35 and a ball nut 37. The ball nut 37 can be secured to the bridge frame 27.

The bridge frame 27 can support a bridge frame actuator 18 to move a spindle holder 20 on a y-axis while the support frame 8 moves the bridge fame on the aforementioned x-axis. In embodiments, the bridge frame actuator 18 can be a linear actuator with a ball screw and ball nut, similar to, but shorter in length than the support frame actuator 14.

A pneumatic spindle 21 can be mounted to the spindle holder 20 and connected to a pneumatic air supply for both calibration and cutting.

In embodiments, the support frame 8 can be from 30 inches to 50 inches long by 12 inches to 24 inches.

In embodiments, the bridge frame 27 can be from 12 inches to 24 inches long and 2 inches to 6 inches wide.

The support frame 8 can be made from cast iron. The bridge frame 27 can be made from aluminum.

The voltage to operate the actuators can be from a 110 volt power supply.

A plurality of jack screws 57a-57d can be used. At least two jack screws 57a and 57b can be used to secure each leg to the blowout preventer once the legs are installed in the grooves.

A first bridge bearing 43a and a second bridge bearing 43b can be used to support the spindle holder 20.

Figure 2:
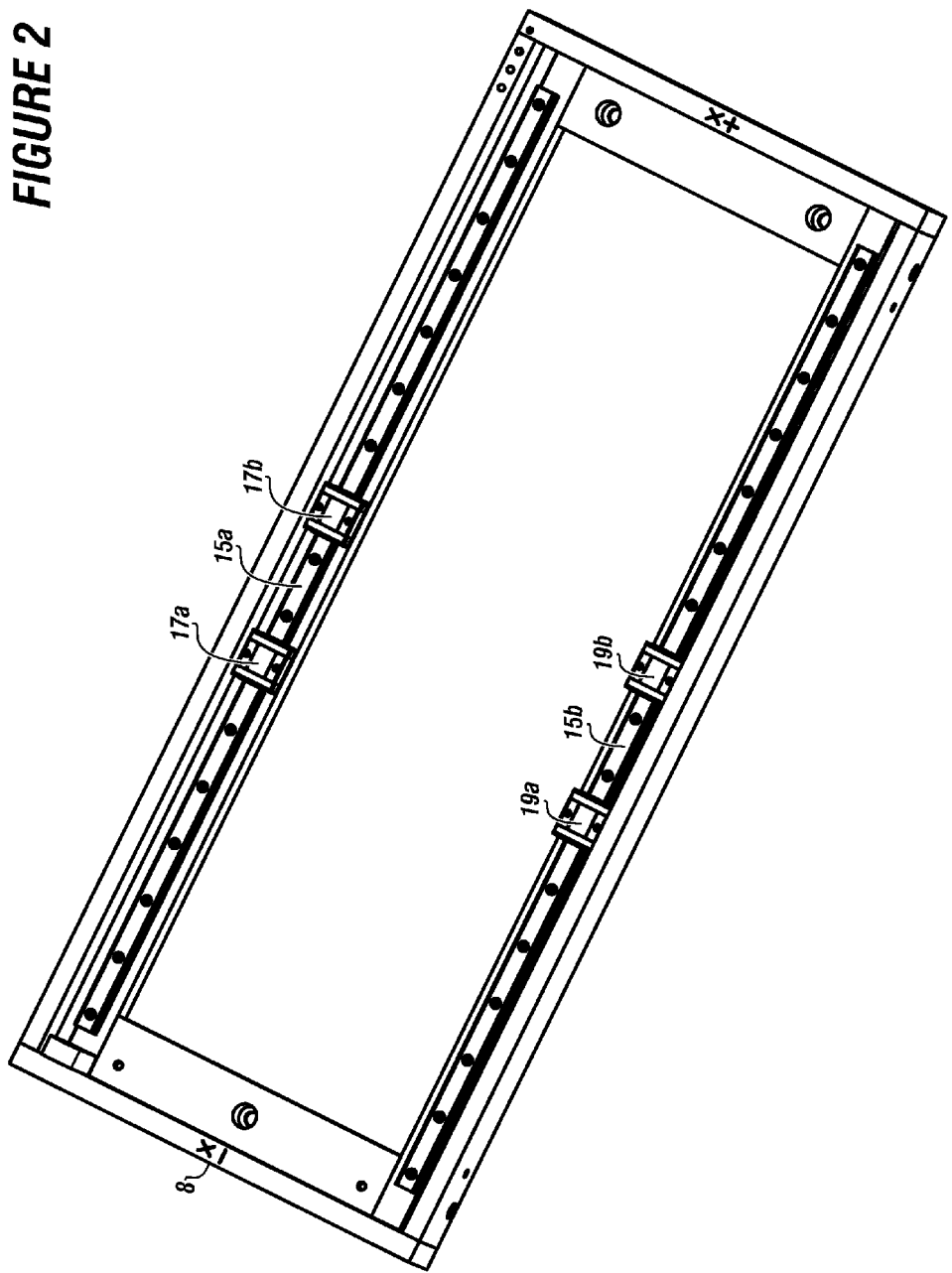
FIG. 2 depicts a detailed isometric view of a support frame.

FIG. 2 depicts a detailed isometric view of the support frame.

The support frame 8 is shown with the first support frame rail 15a and the second support frame rail 15b.

A plurality of first support frame bearings 17a and 17b can be mounted to the first support frame rail 15a.

A plurality of second support frame bearings 19a and 19b can be mounted to the second support frame rail 15b.

The bridge frame can be mounted over the plurality of first support frame bearings 17a and 17b and the plurality of second support frame bearings 19a and 19b enabling the bridge frame to slide on the first support frame rail 15a and the second support frame rail 15b.

Figure 3:
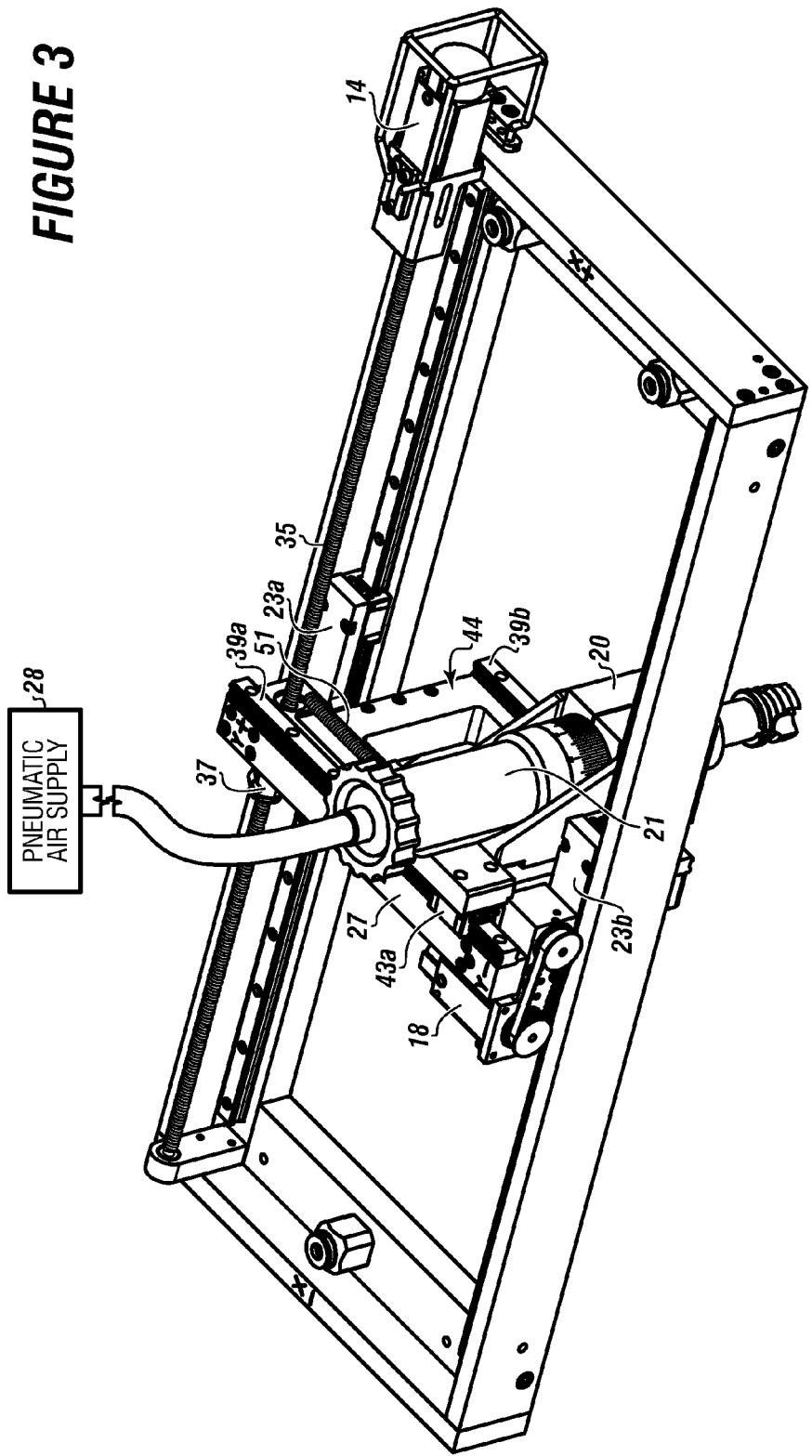
FIG. 3 depicts an isometric view of a support frame with the bridge frame.

FIG. 3 depicts an isometric view of a support frame with a bridge frame.

The support frame actuator 14 can move the bridge frame 27 along the first support frame rail and the second support frame rail with a ball screw 35 that connects to a ball nut 37.

A first carriage plate 23a is shown riding on the first support frame rail while a second carriage plate 23b rides on the second support frame rail.

The bridge frame 27 can have a first bridge rail 39a and a second bridge rail 39b, both which can be mounted to a first side 44 of the bridge frame 27.

The first bridge rail 39a and second bridge rail 39b can be mounted in parallel to each other like the first support frame rail and second support frame rail.

In embodiments, the first bridge rail 39a and second bridge rail 39b can run the width of the bridge frame 27. The bridge frame 27 can have additional bridge rails in order to support the bridge frame 27. The second bridge rail 39b can also be used to support the spindle holder 20.

The first bridge rail 39a and the second bridge rail 39b can be from 12 inches to 24 inches in length. The bridge rails can be made from carbon steel. The first bridge rail 39a and the second bridge rail 39b can be attached to the bridge frame 27 with fasteners, such as bolts and screws.

A bridge frame actuator 18 can be mounted to the bridge frame 27. The bridge frame actuator 18 can move the spindle holder 20 along the first bridge rail 39a and the second bridge rail 39b at a 90 degree angle to the direction the support frame actuator 14 moves the bridge frame 27 on the first and second support frame rails, which is along a y-axis.

The spindle holder 20 can be connected to a pneumatic air supply 28.

The first carriage plate 23a can be mounted over the plurality of first support bearings 17a and 17b for slidably engaging the first support frame rail.

The second carriage plate 23b can be mounted over the plurality of second support bearings 19a and 19b for slidably engaging the second support frame rail.

The support frame actuator 14 can move the two carriage plates 23a and 23b along the support frame in a linear motion in parallel. Any actuator means that can move the weight of the bridge frame can be used, particularly actuators that are usable in the deep sea without failing, such as in 5,000 feet of water.

The first bridge bearing 43a and the second bridge bearing can be used to support the spindle holder 20.

In embodiments, the ball screw 35 can penetrate the ball nut 37 secured to the bridge frame 27, thereby allowing the bridge frame 27 to move on simultaneously on the support frame rails perpendicular to movement of the spindle holder 20 on the bridge rails.

In embodiments, the bridge frame actuator 18 can be a linear actuator that uses a bridge ball screw 51 parallel to the bridge rails. The bridge ball screw 51 can penetrate a bridge ball nut secured to the spindle holder 20, thereby allowing the spindle holder 20 to move on the bridge rail perpendicular to the support frame rails.

A pneumatic spindle 21 is also shown.

Figure 4:
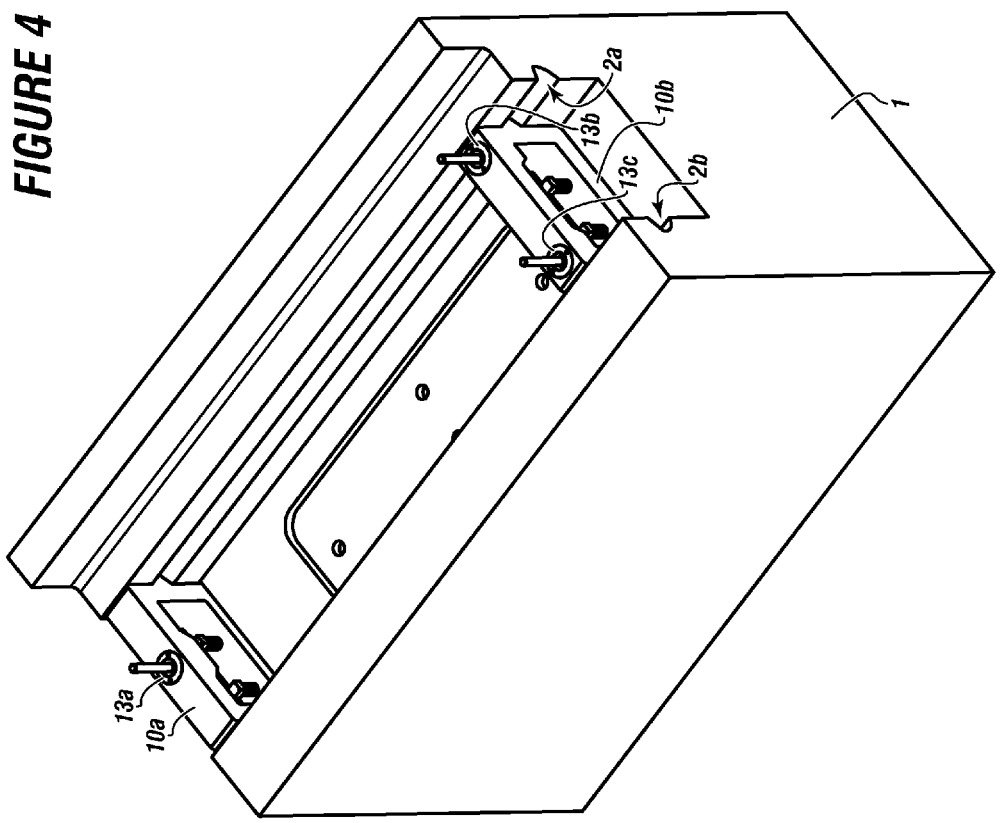
FIG. 4 depicts an isometric view of the legs installed in the grooves of the blowout preventer with spring loaded mounting assemblies.

FIG. 4 depicts an isometric view of the first leg 10a and second leg 10b installed in the first groove 2a and the second groove 2b of the blowout preventer 1.

Spring loaded mounting assemblies 13a, 13b, and 13c can be used to hold the legs into the blowout preventer 1.

Each spring loaded mounting assembly 13a-13c can include a threaded rod, a die spring surrounding the threaded rod, an adjustment screw cap mounted to the threaded rod, a flange nut mounted to the threaded rod, a washer, a holding jig connected to the threaded rod, and an adjustment screw mounted to the support frame.

The legs can be carbon steel legs from 3 inches to 5 inches in thickness. The first leg 10a and the second leg 10b can be mounted adjustably and movably in the first and second grooves 2a and 2b. The legs can be from 9 inches and 14 inches in height.

Figure 5:
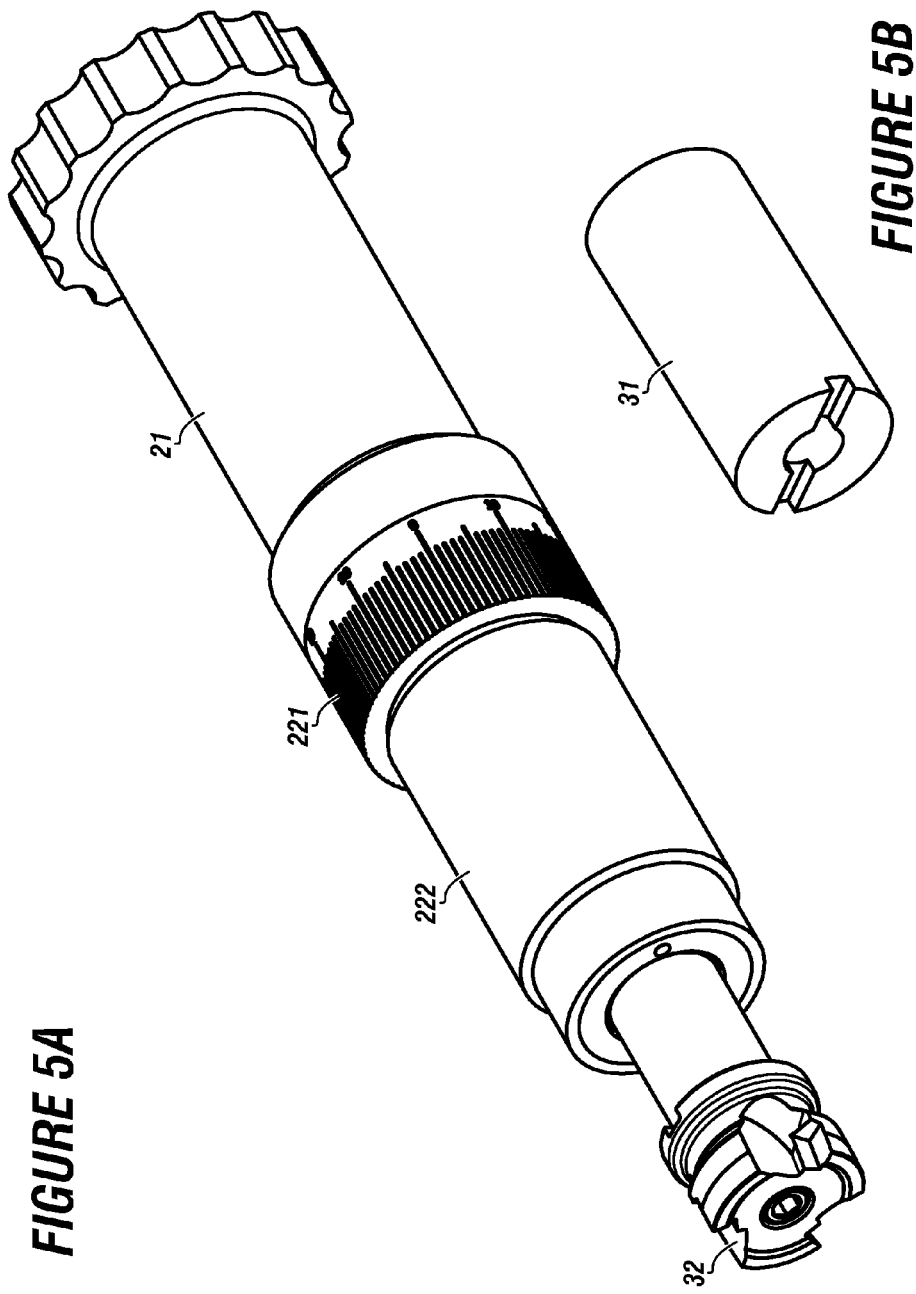
FIG. 5A depicts an isometric view of an embodiment of a pneumatic spindle.
FIG. 5B depicts an isometric view of an embodiment of a calibration head for use with the pneumatic spindle.

FIG. 5A depicts an isometric view of an embodiment of a pneumatic spindle.

The pneumatic spindle 21 can have a cutting head 32. In embodiments, the cutting head 32 can be a fly cutter. The pneumatic spindle 21 can be removably mounted in the spindle holder.

The cutting head can be purchased from Meridian Equipment, Inc. of Houston, Tex.

The pneumatic spindle can use a threaded body 222 to receive the cutting head 32 and a graduated rotatable dial 221.

FIG. 5B depicts an isometric view of an embodiment of a calibration head for use with the pneumatic spindle.

A calibration head 31, which can be an anodized aluminum calibration head, can engage the threaded body with a graduated rotatable dial. The calibration head 31 can be installed to the threaded body or the calibration head can be removed from the threaded body and the cutting head can be installed, creating a versatile spindle.

Figure 6:
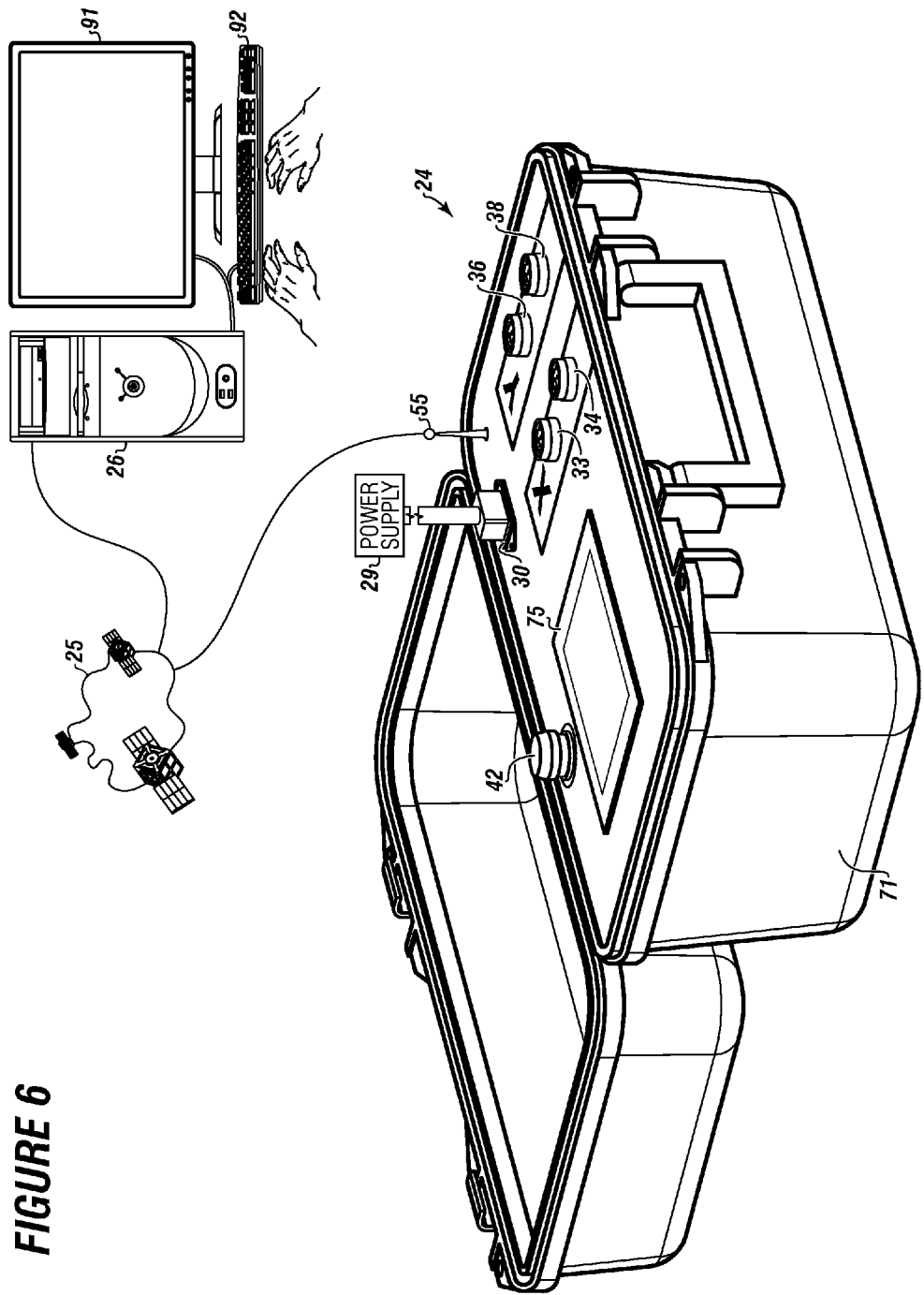
FIG. 6 depicts an embodiment of the portable controller connected to a network for communication with a client device.

FIG. 6 depicts an embodiment of the portable controller 24 connected to a network 25 for communication with a client device 26.

The client device 26 can have a client device processor connected to a client device display 91 and a client device input device 92, such as a keyboard. The client device 26 can be a laptop, a computer, a cellular phone, a smart phone, a tablet computer, or another remote processing device with bidirectional communication for communicating with the portable controller 24.

The network 25 can be a local area network, a wide area network, the internet, a cellular network, peer to peer network, satellite network, another global communication network, such as the internet, combinations thereof, or other type of networks capable of bi-directional communication.

The portable controller 24 can be encased in a closable housing 71. The closable housing can be plastic or a rubberized plastic, impact resistant, and water proof when closed.

The portable controller 24 can include a power supply inlet 30 formed on a face plate in the closable housing 71. The power can be 110 volt or 220 volt AC power. In embodiments, the power can be input into the portable controller and can be passed through an AC/DC converter for changing the AC power to DC power prior to operating the actuators on the frames. In embodiment the portable controller can receive DC power from onboard batteries. The actuators can be operated from 12 volts to 29 volts.

For controlling the x-axis movement of the pneumatic spindle with the calibration head or the cutting head, the portable controller can transmit commands from a processor with a portable controller display 75 mounted to the face plate to a support frame actuator output 34.

In embodiments the pneumatic spindle can be operated at a pressure from 60 psi to 120 psi.

A cable can connect between the support frame actuator output 34 transmitting commands to the support frame actuator.

The support frame actuator can communicate to the portable controller via a support frame actuator input 33.

A cable can connect from a power supply 29 via the power supply inlet 30 to the portable controller 24.

The portable controller 24 can also be in communication with the bridge frame actuator.

The portable controller 24 can have a bridge frame actuator input 36 for receiving signals from the bridge frame actuator for storage in a data storage connected to the portable controller processor.

For controlling the x-axis movement of the spindle with the calibration head or the cutting head, the portable controller can use a bridge frame actuator output 38 for transmitting commands and power to the bridge frame actuator.

The portable controller 24 can have an internet connection 55 allowing the processor of the portable controller to communicate with the network 25, the internet or another network.

The portable controller display 75 can be configured as a touch screen, acting as both an input device and a display device, much like a tablet computer.

The portable controller 24 can have an emergency stop button 42 to terminate power to the actuators and pneumatic spindle with either the cutting head or calibration head.

An AC/DC converter can be in the portable controller to provide power from a source to the actuators.

Figure 7:
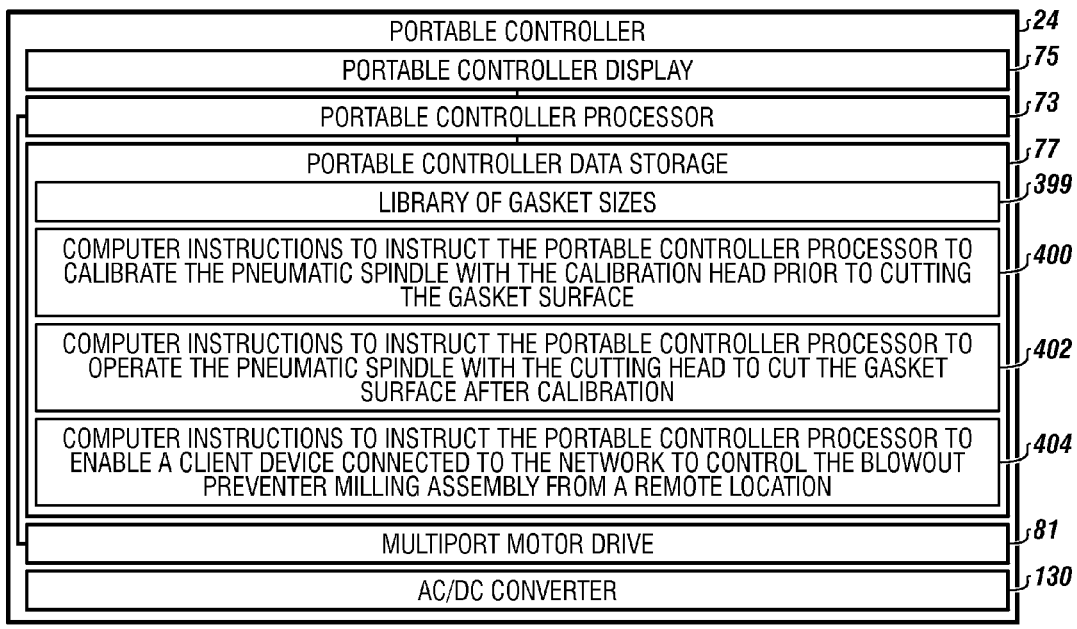
FIG. 7 depicts a diagram of the portable controller.

FIG. 7 depicts a diagram of the portable controller 24.

The portable controller 24 can include the portable controller display 75, a portable controller processor 73, a portable controller data storage 77, and a multiport motor drive 81. A usable multiport motor drive can be an ACS motion control made by Minarick Automation and Control of Houston Tex.

The portable controller processor 73 can be connected to the portable controller display 75, and the portable controller data storage 77. The portable controller processor 73 can be used to execute computer instructions in the portable controller data storage.

The portable controller data storage 77 can include a library of gasket sizes 399.

Gasket sizes can differ depending on the type of blowout preventer. For example, a blowout preventer gasket size can be from 8 inches to 12 inches wide and from 24 inches to 40 inches long.

The portable controller data storage 77 can include computer instructions 400 to instruct the portable controller processor to calibrate the pneumatic spindle with the calibration head prior to cutting the gasket surface.

The portable controller data storage 77 can include computer instructions 402 to instruct the portable controller processor to operate the pneumatic spindle with the cutting head to cut the gasket surface after calibration.

The portable controller data storage 77 can include computer instructions 404 to instruct the portable controller processor to enable a client device connected to the network to control the blowout preventer milling assembly from a remote location.

An AC/DC converter 130 can be in the portable controller to provide power from a source to the actuators.

FIG. 8 depicts an embodiment for using the blowout preventer milling assembly.

The blowout preventer milling assembly can include opening a blowout preventer door to reveal a chamber surrounding a gasket of a blowout preventer, as step 300.

The blowout preventer milling assembly can include inserting legs into grooves on opposite sides of the gasket, as step 302.

The blowout preventer milling assembly can include attaching the blowout preventer milling assembly to the legs, as step 304. In embodiments, spring loaded mounting assemblies can be used.

The blowout preventer milling assembly can include inserting a pneumatic spindle with a calibration head into the spindle holder on the bridge frame, as step 306.

The blowout preventer milling assembly can include connecting a support frame actuator and a bridge frame actuator to a portable controller that can be connected to a power supply, as step 308.

The blowout preventer milling assembly can include locating a gasket surface in a blowout preventer using the calibration head and portable controller, as step 310.

The blowout preventer milling assembly can include obtaining a preset size of the gasket for the particular blowout preventer from a library of gasket sizes in the portable controller data storage, as step 311.

The blowout preventer milling assembly can include using computer instructions in the portable controller data storage to instruct the portable controller processor to align the spindle holder to the center of the gasket surface on the blowout preventer, as step 312.

The blowout preventer milling assembly can include verifying that the gasket surface can be aligned with the support frame rails using an indicator on the calibration head, as step 313.

The blowout preventer milling assembly can include removing the calibration head and placing a cutting head on the pneumatic spindle, and placing the pneumatic spindle with cutting head in the spindle holder, as step 314. The cutting head can be connected to a pneumatic power supply, such as a pneumatic air supply.

The blowout preventer milling assembly can include using the cutting head and the portable controller to mill the gasket surface in a blowout preventer, as step 315. The milling can be done automatically, or by remote control using a client device connected to a network, wherein the client device can be remote from the cutting head.

The blowout preventer milling assembly can include disengaging the cutting head from the power supply and removing the blowout preventer milling assembly, as step 316.

The blowout preventer milling assembly can include removing the legs, as step 317.

FIG. 9A depicts a rig usable with the blowout preventer milling assembly.

The rig can be a production rig for use in processing with hydrocarbons from a subsea well, a drilling rig for drilling for hydrocarbons from a subsea wellbore, or similar rig usable with the invention.

The rig 1000 can include a derrick 1002 on a platform 1004.

The platform 1004 is shown as a floating semi-submersible. In other embodiments, the platform 1004 can be a spar, a tension leg platform, a jack up platform, a drill ship, or another floating vessel.

A hoist 1006 can be mounted to the derrick 1002. The derrick 1002 can also be a tower. In embodiments, the derrick 1002 can be a plurality of towers mounted to the platform. The hoist 1006 can include a hook with traveling block rolling over sheaves on the crown of the derrick 1002 or tower.

A drawworks 1008 can be connected to the hoist 1006. A generator 1010 with a fuel supply 1012 can be mounted to the platform 1004. The generator 1010 can operate the drawworks 1008 and hoist 1006.

The portable controller 24 can rest on the deck of the platform 1004 and can be connected to the generator 1010.

Tubulars 1014a and 1014b are shown extending from the platform to a wellbore 1016. In embodiments, the tubulars 1014a and 1014b can be casing. The blowout preventer 1 can be mounted to the tubular 1014b.

FIG. 9B shows a detail of the blowout preventer milling assembly 5 installed on the blowout preventer.

The second leg 10b is shown installed in the grooves of the blowout preventer.

The support frame 8 along with the spindle holder 20 is shown mounted to the bridge frame 27.

FIG. 10 shows an embodiment for repairing a blowout preventer while in an operational configuration at sea using the blowout preventer milling assembly.

Step 2000 involves lifting a blowout preventer while secured to casings or tubulars and in an operational configuration to a deck or platform of a rig at sea.

Step 2002 involves locking the blowout preventer to the deck or platform of a rig at sea.

Step 2004 involves opening doors of a gasket chamber of the blowout preventer exposing a gasket surface.

Step 2006 involves sliding a pair of legs into grooves in the gasket chamber.

Step 2008 involves attaching a blowout preventer milling assembly to the pair of legs using a plurality of spring loaded mounting assemblies.

Step 2010 involves inserting a pneumatic spindle with a calibration head into a spindle holder of the blowout preventer milling assembly.

Step 2012 involves connecting at a support frame actuator of the blowout preventer milling assembly to a portable controller, and connecting a bridge frame actuator of the blowout preventer milling assembly to the portable controller; enabling simultaneous movement along an x-axis and y-axis of the blowout preventer milling assembly.

Step 2014 involves connecting the portable controller to a power supply.

Step 2016 involves calibrating a location of the pneumatic spindle over the gasket surface using the portable controller; the portable controller controlling x-axis and y-axis movement simultaneously by both actuators.

Step 2018 involves obtaining a preset size of the gasket surface from a library of gasket sizes in the portable controller data storage.

Step 2020 involves replacing the calibration head of the pneumatic spindle after calibration with a cutting head.

Step 2020 involves connecting the pneumatic spindle with the cutting head to a pneumatic air supply.

Step 2022 involves activating the pneumatic air supply to provide pressurized air in a range of 85 psi to 95 psi to the pneumatic spindle with the cutting head.

Step 2024 involves automatically refinishing the gasket surface using the cutting head by simultaneously moving the support frame actuator along an x-axis and the bridge frame actuator along a y-axis, moving the pneumatic spindle in a predetermined pattern over the gasket surface using an identified gasket size bi-directionally.

Step 2026 involves de-energizing the pneumatic air supply.

Step 2028 involves disengaging the pneumatic spindle with the cutting head from the de-energized pneumatic air supply.

Step 2030 involves removing the blowout preventer milling assembly from the pair of legs.

Step 2032 involves removing the pair of legs from the grooves of the blowout preventer forming a repaired blowout preventer gasket while the blowout preventer is in operational configuration at sea and while the blowout preventer is in line with casing or tubulars and secured to casings or tubulars of a wellbore.

Embodiments of the method can include using a portable controller with: a closable housing; a power supply inlet port formed in the closable housing; a support frame actuator output for transmitting commands and power to the support frame actuator; a support frame actuator input for receiving signals from the support frame actuator; a bridge frame actuator output for transmitting commands and power to the bridge frame actuator; and a bridge frame actuator input for receiving signals from the bridge frame actuator; and wherein the portable controller processor can be connected between the support frame actuator output and the bridge frame actuator output, the support frame actuator input and the bridge frame actuator input, and the power supply.

Embodiments of the method can include using from the portable controller data storage: a library of gasket sizes; and using computer instructions in the portable controller data storage to instruct the portable controller processor to calibrate the pneumatic spindle with the calibration head prior to cutting the gasket surface; computer instructions to instruct the portable controller processor to operate the pneumatic spindle with the cutting head to cut the gasket surface after calibration; and computer instructions to instruct the portable controller processor to enable the client device connected to the network to control the blowout preventer milling assembly from the remote location.

Embodiments of the method can include installing: a plurality of the first set of support frame bearings slidably engaging the first support frame rail; a plurality of the second set of support frame bearings slidably engaging the second support frame rail; a first carriage plate attached to the plurality of the first set of support frame bearings; and a second carriage plate attached to the plurality of the second set of support frame bearings; and wherein the bridge frame can be secured to the first carriage plate and the second carriage plate over the plurality of the first set of support frame bearings and the plurality of the second set of support frame bearings.

Embodiments of the method can include installing a plurality of bridge bearings slidably on one of the bridge rails to support the bridge frame and a third bridge bearing on an opposing bridge rail to support a spindle mount.

Embodiments of the method include using a fly cutter as the cutting head.

While these embodiments have been described with emphasis on the embodiments, it should be understood that within the scope of the appended claims, the embodiments might be practiced other than as specifically described herein.

What is claimed is:

1. A method for repairing a blowout preventer while in an operational configuration at sea using a blowout preventer milling assembly, the method comprising:
  a. lifting the blowout preventer while secured to casings or tubulars and in the operational configuration to a platform;
  b. locking the blowout preventer to the platform;
  c. opening doors of a gasket chamber of the blowout preventer exposing a gasket surface;
  d. sliding a pair of legs into a pair of grooves in the gasket chamber;
  e. attaching the blowout preventer milling assembly to the pair of legs using a plurality of spring loaded mounting assemblies;
  f. inserting a pneumatic spindle with a calibration head into a spindle holder of the blowout preventer milling assembly;
  g. connecting a support frame actuator of the blowout preventer milling assembly to a portable controller and connecting a bridge frame actuator of the blowout preventer milling assembly to the portable controller enabling simultaneous movement along an x-axis and a y-axis of the blowout preventer milling assembly;
  h. connecting the portable controller to a power supply;
  i. calibrating a location of the pneumatic spindle over the gasket surface using the portable controller, wherein the portable controller controlling simultaneous movement along the x-axis and the y-axis by both the support frame actuator and the bridge frame actuator;

j. obtaining a preset size of the gasket surface from a library of gasket sizes in a portable controller data storage of the portable controller;

k. replacing the calibration head of the pneumatic spindle after calibration with a cutting head;

l. connecting the pneumatic spindle with the cutting head to a pneumatic air supply;

m. activating the pneumatic air supply to provide pressurized air in a range from 85 psi to 95 psi to the pneumatic spindle with the cutting head;

n. automatically refinishing the gasket surface using the cutting head by simultaneously moving the support frame actuator along the x-axis and the bridge frame actuator along the y-axis, moving the pneumatic spindle in a predetermined pattern over the gasket surface using an identified gasket size bi-directionally;

o. de-energizing the pneumatic air supply;

p. disengaging the pneumatic spindle with the cutting head from the de-energized pneumatic air supply;

q. removing the blowout preventing milling assembly from the pair of legs; and r. removing the pair of legs from the pair of grooves of the blowout preventer forming a repaired blowout preventer gasket while the blowout preventer is in the operational configuration at sea and while the blowout preventer is in line with casings or tubulars and secured to casings or tubulars of a wellbore.

2. The method of claim 1, comprising previewing installation of the blowout preventer milling assembly using a portable controller display connected to the portable controller.

3. The method of claim 1, comprising using an emergency stop button to quickly terminate power to the blowout preventer milling assembly.

4. The method of claim 1, comprising using the plurality of spring loaded mounting assemblies to connect the support frame to the pair of legs.

5. The method of claim 1, comprising connecting a portable controller processor of the portable controller to both a multiport motor drive of the portable controller and a network for communicating with a client device, enabling the blowout preventer milling assembly to be operated from a remote location with the client device connected to the network.

6. The method of claim 1, wherein the portable controller comprises:

a. a portable controller processor;

b. a portable controller display connected to the portable controller processor;

c. the portable controller data storage connected to the portable controller processor; and wherein the portable controller controls movement of the pneumatic spindle by using the support frame actuator to control movement on the x-axis and using the bridge frame actuator to control movement of the pneumatic spindle on the y-axis.

7. The method of claim 1, wherein the portable controller data storage comprises:

a. the library of gasket sizes to identify the size of the gasket; and b. computer instructions to instruct a portable controller processor to:
  (i) calibrate the pneumatic spindle with the calibration head prior to cutting the gasket surface;
  (ii) operate the pneumatic spindle with the cutting head to cut the gasket surface after calibration; and
  (iii) enable a client device connected to a network to control the blowout preventer milling assembly from a remote location.

8. The method of claim 1, comprising:

a. a plurality of first support frame bearings, each first support frame bearing of the plurality of first support frame bearings slidably engaging a first support frame rail;

b. a plurality of second support frame bearings, each second support frame bearing of the plurality of second support frame bearings slidably engaging a second support frame rail;

c. a first carriage plate attached to the plurality of first support frame bearings;

d. a second carriage plate attached to the plurality of second support frame bearings; and e. a plurality of first bridge bearings engaging a first bridge rail; and f. a second bridge bearing engaging a second bridge rail; and wherein a bridge frame is secured to the first carriage plate and the second carriage plate over the plurality of first support frame bearings and the plurality of second support frame bearings.

9. The method of claim 1, comprising using a fly cutter as the cutting head.

* * * * *